(12) United States Patent  (10) Patent No.: US 9,559,897 B2
Lin et al.  (45) Date of Patent: Jan. 31, 2017

(54) DEVICE ID ASSIGNMENT IN A SYSTEM OF DEVICES

(71) Applicant: Brocade Communications Systems, Inc., San Jose, CA (US)

(72) Inventors: Kwun-Nan Kevin Lin, Saratoga, CA (US); Shafiuddin Mohammed, Fremont, CA (US); Ravi Swamy, Santa Clara, CA (US); Shyamsunder Prayagchand Rathi, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 185 days.

(21) Appl. No.: 14/106,302

(22) Filed: Dec. 13, 2013

(65) Prior Publication Data

US 2014/0181275 A1    Jun. 26, 2014

Related U.S. Application Data

(60) Provisional application No. 61/745,396, filed on Dec. 21, 2012, provisional application No. 61/799,093, filed on Mar. 15, 2013.

(51) Int. Cl.
*G06F 15/177* (2006.01)
*H04L 12/24* (2006.01)

(52) U.S. Cl.
CPC ....... *H04L 41/0803* (2013.01); *H04L 41/0866* (2013.01); *H04L 41/12* (2013.01)

(58) Field of Classification Search
USPC ........................................................ 709/220
See application file for complete search history.

(56) References Cited

U.S. PATENT DOCUMENTS 4,625,308 A    11/1986    Kim et al.
5,481,073 A    1/1996    Singer et al.
(Continued)

FOREIGN PATENT DOCUMENTS

EP    2924927 A1    9/2015
WO    2015026950 A1    2/2015

OTHER PUBLICATIONS

International Search Report and Written Opinion for International Application No. PCT/US2013/076251 dated May 22, 2014, 11 pages.
(Continued)

*Primary Examiner* — Vivek Srivastava
*Assistant Examiner* — Hermon Asres
(74) *Attorney, Agent, or Firm* — Fountainhead Law Group P.C.

(57) ABSTRACT

Techniques for assigning device identifiers in a system of devices are provided. In one embodiment, a master device of the system can maintain a first configuration that specifies a set of links between a first subset of the devices, where the first configuration includes a device identifier for each device in the first subset. The master device can further generate a second configuration that specifies a set of links between a second subset of the devices, where the second configuration is based on a physical topology of the system, and where one or more devices in the second subset are unknown devices that are not associated with a device identifier in the physical topology. The master device can then assign device identifiers to the unknown devices in the second subset by comparing the first configuration with the second configuration.

18 Claims, 10 Drawing Sheets

(56) References Cited

U.S. PATENT DOCUMENTS

| | | |
|---|---|---|
| 5,651,003 A | 7/1997 | Pearce et al. |
| 6,243,756 B1 | 6/2001 | Whitmire et al. |
| 6,366,582 B1 | 4/2002 | Nishikado et al. |
| 6,373,840 B1 | 4/2002 | Chen |
| 6,490,276 B1 | 12/2002 | Salett et al. |
| 6,496,502 B1 | 12/2002 | Fite, Jr. et al. |
| 6,516,345 B1 | 2/2003 | Kracht |
| 6,526,345 B2 | 2/2003 | Ryoo |
| 6,597,658 B1 | 7/2003 | Simmons |
| 6,725,326 B1 | 4/2004 | Patra et al. |
| 6,765,877 B1 | 7/2004 | Foschiano et al. |
| 6,807,182 B1 | 10/2004 | Dolphin et al. |
| 6,839,342 B1 | 1/2005 | Parham et al. |
| 6,839,349 B2 | 1/2005 | Ambe et al. |
| 7,093,027 B1 | 8/2006 | Shabtay et al. |
| 7,099,315 B2 | 8/2006 | Ambe et al. |
| 7,106,736 B2 | 9/2006 | Kalkunte |
| 7,136,289 B2 | 11/2006 | Vasavda et al. |
| 7,184,441 B1 | 2/2007 | Kadambi et al. |
| 7,206,283 B2 | 4/2007 | Chang et al. |
| 7,206,309 B2 | 4/2007 | Pegrum et al. |
| 7,274,694 B1 | 9/2007 | Cheng et al. |
| 7,336,622 B1 | 2/2008 | Fallis et al. |
| 7,426,179 B1 | 9/2008 | Harshavardhana et al. |
| 7,480,258 B1 | 1/2009 | Shuen et al. |
| 7,496,096 B1 | 2/2009 | Dong et al. |
| 7,523,227 B1 | 4/2009 | Yager et al. |
| 7,602,787 B2 | 10/2009 | Cheriton |
| 7,697,419 B1 | 4/2010 | Donthi |
| 7,933,282 B1 | 4/2011 | Gupta et al. |
| 8,209,457 B2 | 6/2012 | Engel et al. |
| 8,750,144 B1 | 6/2014 | Zhou et al. |
| 8,949,574 B2 | 2/2015 | Slavin |
| 9,032,057 B2 | 5/2015 | Agarwal et al. |
| 9,148,387 B2 | 9/2015 | Lin et al. |
| 9,185,049 B2 | 11/2015 | Agarwal et al. |
| 9,269,439 B1 | 2/2016 | Levy et al. |
| 9,282,058 B2 | 3/2016 | Lin et al. |
| 9,313,102 B2 | 4/2016 | Lin et al. |
| 2001/0042062 A1 | 11/2001 | Tenev et al. |
| 2002/0046271 A1 | 4/2002 | Huang |
| 2002/0101867 A1 | 8/2002 | O'Callaghan et al. |
| 2003/0005149 A1 | 1/2003 | Haas et al. |
| 2003/0169734 A1 | 9/2003 | Lu et al. |
| 2003/0174719 A1 | 9/2003 | Sampath et al. |
| 2003/0188065 A1 | 10/2003 | Golla et al. |
| 2005/0063354 A1 | 3/2005 | Garnett et al. |
| 2005/0141513 A1 | 6/2005 | Oh et al. |
| 2005/0198453 A1 | 9/2005 | Osaki |
| 2005/0243739 A1* | 11/2005 | Anderson ......... H04L 29/12009 370/254 |
| 2005/0271044 A1 | 12/2005 | Hsu et al. |
| 2006/0013212 A1 | 1/2006 | Singh et al. |
| 2006/0023640 A1 | 2/2006 | Chang et al. |
| 2006/0072571 A1 | 4/2006 | Navada et al. |
| 2006/0077910 A1 | 4/2006 | Lundin et al. |
| 2006/0092849 A1* | 5/2006 | Santoso ................ H04L 45/583 370/244 |
| 2006/0092853 A1 | 5/2006 | Santoso et al. |
| 2006/0176721 A1 | 8/2006 | Kim et al. |
| 2006/0187900 A1 | 8/2006 | Akbar |
| 2006/0253557 A1 | 11/2006 | Talayco et al. |
| 2006/0280125 A1 | 12/2006 | Ramanan et al. |
| 2006/0294297 A1 | 12/2006 | Gupta |
| 2007/0081463 A1 | 4/2007 | Bohra et al. |
| 2007/0121673 A1 | 5/2007 | Hammer |
| 2007/0174537 A1 | 7/2007 | Kao et al. |
| 2008/0137530 A1 | 6/2008 | Fallis et al. |
| 2008/0192754 A1 | 8/2008 | Ku et al. |
| 2008/0281947 A1 | 11/2008 | Kumar |
| 2009/0125617 A1* | 5/2009 | Klessig ............... H04L 41/0806 709/223 |
| 2009/0135715 A1 | 5/2009 | Bennah |
| 2009/0141641 A1 | 6/2009 | Akahane et al. |
| 2010/0172365 A1 | 7/2010 | Baird et al. |
| 2010/0182933 A1 | 7/2010 | Hu et al. |
| 2010/0185893 A1* | 7/2010 | Wang ..................... H04L 41/12 714/3 |
| 2010/0257283 A1 | 10/2010 | Agarwal |
| 2010/0284414 A1 | 11/2010 | Agarwal et al. |
| 2010/0293200 A1 | 11/2010 | Assarpour |
| 2010/0329111 A1* | 12/2010 | Wan ....................... H04L 69/40 370/218 |
| 2011/0238923 A1 | 9/2011 | Hooker et al. |
| 2011/0268123 A1 | 11/2011 | Kopelman et al. |
| 2012/0020373 A1 | 1/2012 | Subramanian et al. |
| 2012/0087232 A1 | 4/2012 | Hanabe et al. |
| 2012/0155485 A1 | 6/2012 | Saha et al. |
| 2012/0246400 A1 | 9/2012 | Bhadra et al. |
| 2013/0170495 A1 | 7/2013 | Suzuki et al. |
| 2013/0201984 A1 | 8/2013 | Wang |
| 2013/0215791 A1 | 8/2013 | Lin et al. |
| 2013/0232193 A1 | 9/2013 | Ali et al. |
| 2013/0262377 A1 | 10/2013 | Agarwal |
| 2014/0003228 A1 | 1/2014 | Shah et al. |
| 2014/0006706 A1 | 1/2014 | Wang |
| 2014/0071985 A1 | 3/2014 | Kompella et al. |
| 2014/0075108 A1 | 3/2014 | Dong et al. |
| 2014/0112190 A1 | 4/2014 | Chou et al. |
| 2014/0112192 A1 | 4/2014 | Chou et al. |
| 2014/0122791 A1 | 5/2014 | Fingerhut |
| 2014/0126354 A1 | 5/2014 | Hui et al. |
| 2014/0153573 A1 | 6/2014 | Ramesh et al. |
| 2014/0269402 A1 | 9/2014 | Vasseur et al. |
| 2014/0314082 A1 | 10/2014 | Korpinen et al. |
| 2014/0334477 A1 | 11/2014 | Lin et al. |
| 2014/0341079 A1 | 11/2014 | Lin et al. |
| 2014/0341080 A1 | 11/2014 | Lin et al. |
| 2014/0376361 A1 | 12/2014 | Hui et al. |
| 2015/0016277 A1 | 1/2015 | Smith et al. |
| 2015/0036479 A1 | 2/2015 | Gopalarathnam |
| 2015/0055452 A1 | 2/2015 | Lee |
| 2015/0117263 A1 | 4/2015 | Agarwal et al. |
| 2015/0124826 A1 | 5/2015 | Edsall et al. |
| 2015/0229565 A1 | 8/2015 | Ravipati et al. |
| 2015/0281055 A1 | 10/2015 | Lin et al. |
| 2015/0288567 A1 | 10/2015 | Lin et al. |
| 2016/0028652 A1 | 1/2016 | Agarwal et al. |
| 2016/0173332 A1 | 6/2016 | Agarwal et al. |
| 2016/0173339 A1 | 6/2016 | Lin et al. |

OTHER PUBLICATIONS

Office Action Dated Jul. 16, 2015; U.S. Appl. No. 14/094,931; (41 pgs.).

Extended European Search Report dated Jul. 30, 2015 for EP Appln. 15000834.0; 8 pages.

Pei et al.: "Putting Routing Tables in Silicon", IEEE Network, IEEE Service Center, New York, NY; vol. 6, No. 1, Jan. 1, 1992; pp. 42-50.

Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.

Notice of Allowance dated Aug. 3, 2015; U.S. Appl. No. 14/207,146 (38 pgs.).

Notice of Allowance dated Sep. 17, 2015; U.S. Appl. No. 14/268,507 (15 pgs.).

Amendment to Carrier Multiple Access with Collision Detection (CSMA/CD Access Method and Physical Layer Specifications—Aggregation of Multi[ple Link Segments; IEEE Std. 802.3ad; 2000; 183 pages.

Appeal Brief Dated Jan. 18, 2013; U.S. Appl. No. 12/463,964 (23p.).

Brocade: "FastIron Ethernet Switch"; Administration Guide; Supporting FastIron Software Release 08.0.00; Apr. 30, 2013; 400 pages.

Brocade: "FastIron Ethernet Switch"; IP Multicast Configuration Guide; Supporting FastIron Software Release 08.0.00; Apr. 30, 2013; 212 pages.

Brocade: "FastIron Ethernet Switch"; Stacking Configuration Guide; Supporting FastIron Software Release 08.0.00; Apr. 30, 2013; 170 pages.

(56) References Cited

OTHER PUBLICATIONS

Brocade: "FastIron Ethernet Switch"; Traffic Management Guide; Supporting FastIron Software Release 08.0.00; Apr. 30, 2013; 76 pages.
Cisco: "Cisco StackWise and StackWise Plus Technology"; technical white paper; C11-377239-01; Oct. 2010; Copyright 2010; 11 pages.
Cisco: "Delivering High Availability in the Wiring Closet with Cisco Catalyst Switches"; technical white paper; C11-340384-01; Jan. 2007; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/Technology_White_Paper/200812/623012_57_0.htm.
Examiner's Answer Dated May 7, 2013; U.S. Appl. No. 12/463,964 (12 p.).
Extreme Networks Technical Brief: "SummitStack Stacking Technology"; 1346_06; Dec. 2010; 8 pages.
Final Office Action Dated Jan. 23, 2012; U.S. Appl. No. 12/463,964 (11 p.).
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
Understanding and Configuring the Undirectional Link Detection Protocol Feature; Cisco support communication; Jul. 9, 2007; Document ID No. 10591; 5 pages; http://www.cisco.com/c/en/us/support/docs/lan-switching/spanning-tree-protocol/10591-77.html.
Juniper Networks datasheet entitled: "Juniper Networks EX 4200 Ethernet Switches with Virtual Chassis Technology"; Dated Aug. 2013 (12 p.).
U.S. Appl. No. 61/974,924, filed Apr. 3, 2014 by Lin et al.
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
M. Foschiano; Cisco Systems UniDirectional Link Detection (UDLD) Protocol; Memo; Apr. 2008; 13 pages; Cisco Systems.
Migration from Cisco UDLD to industry standard DLDP; technical white paper; Feb. 2012; 12 pages; Hewlett-Packard Development Company.
Office Action dated Mar. 21, 2011; U.S. Appl. No. 12/463,964 (10 p.).
Partial International Search Report for PCT/US2014/051903 dated Nov. 18, 2014.
Reply Brief Dated Jul. 8, 2013; U.S. Appl. No. 12/463,964 (14 p.).
Response to Office Action Dated Mar. 21, 2011; U.S. Appl. No. 12/463,964; Response filed Sep. 21, 2011 (12 p.).
Suckfuell: "Evolution of EWSD During the Eighties"; Institute of Electrical and Electronics Engineers; Global Telecommunications Conference; San Diego; Nov. 28-Dec. 1, 1983; [Global Telecommunications Conference], New York, IEEE, US, vol. 2, Nov. 1, 1983; pp. 577-581.
U.S. Appl. No. 14/171,152, filed Feb. 3, 2014 by Lin et al.
U.S. Appl. No. 14/207,146, filed Mar. 12, 2014 by Lin et al.
U.S. Appl. No. 14/094,931, filed Dec. 3, 2013 by Lin et al.
U.S. Appl. No. 14/268,507, filed May 2, 2014 by Agarwal. (Unpublished.).
U.S. Appl. No. 14/463,419, filed Aug. 19, 2014 by Lee (Unpublished.).
U.S. Appl. No. 14/485,343, filed Sep. 12, 2014 by Lin et al. (Unpublished.).
U.S. Appl. No. 14/506,943, filed Oct. 6, 2014 by Lin et al. (Unpublished.).
U.S. Appl. No. 14/530,193, filed Oct. 31, 2014 by Ravipati et al. (Unpublished.).
U.S. Appl. No. 61/745,396, filed Dec. 21, 2012 by Lin et al.
U.S. Appl. No. 61/799,093, filed Mar. 15, 2013 by Lin et al.
U.S. Appl. No. 61/822,216, filed May 10, 2013 by Lin et al.
U.S. Appl. No. 61/825,449, filed May 20, 2013 by Lin et al.
U.S. Appl. No. 61/825,451, filed May 20, 2013 by Lin et al.
U.S. Appl. No. 61/868,982, filed Aug. 22, 2013 by Lee.
U.S. Appl. No. 61/898,295, filed Oct. 31, 2013 by Agarwal.
U.S. Appl. No. 61/938,805, filed Feb. 12, 2014 by Ravipati et al.
U.S. Appl. No. 61/971,429, filed Mar. 27, 2014 by Sinha et al.
International Search Report and Written Opinion for International Appln. No. PCT/US2014/051903 dated Jan. 27, 2015, 16 pages.
Final Office Action Dated Feb. 13, 2015; U.S. Appl. No. 13/850,118; (14 p.).
U.S. Appl. No. 14/876,639, filed Oct. 6, 2015 by Agarwal et al.
Office Action Dated Feb. 23, 2016; U.S. Appl. No. 14/171,152; (61 pgs.).
Office Action Dated Apr. 29, 2016; U.S. Appl. No. 14/485,343; (72 pgs.).
Notice of Allowance dated Dec. 14, 2015; U.S. Appl. No. 14/094,931 (25 pgs.).
U.S. Appl. No. 14/869,743, filed Sep. 29, 2015 by Agarwal et al.
U.S. Appl. No. 62/092,617, filed Dec. 16, 2014 by Agarwal et al.
Office Action Dated Feb. 18, 2016; U.S. Appl. No. 14/463,419; (74 pgs.).
Notice of Allowance dated Oct. 30, 2015; U.S. Appl. No. 13/850,118 (12 pgs.).
Response to Office Action Dated Jul. 16, 2015; U.S. Appl. No. 14/094,931; Response filed Nov. 12, 2015 (13 p.).
Rooney et al: "Associative Ternary Cache for IP Routing", IEEE, pp. 409-416, 2004.
"Starburst: Building Next-Generation Internet Devices", Sharp et al., Bell Labs Technical Journal, Lucent Technologies, Inc., pp. 6-17, 2002.
NonFinal Office Action Dated Jun. 23, 2016; U.S Appl. No. 14/530,193; (73 pgs.).
NonFinal Office Action Dated Jul. 13, 2016; U.S. Appl. No. 14/876,639; (69 pgs.).
NonFinal Office Action Dated Nov. 9, 2016; U.S. Appl. No. 14/506,943; (18 pgs.).
Final Office Action Dated Aug. 24, 2016; U.S. Appl. No. 14/171,152; (39 pgs.).
Final Office Action Dated Nov. 1, 2016; U.S. Appl. No. 14/485,343; (31 pgs.).

* cited by examiner

DEVICE ID ASSIGNMENT IN A SYSTEM OF DEVICES

CROSS REFERENCES TO RELATED APPLICATIONS

The present application claims the benefit and priority under 35 U.S.C. 119(e) of U.S. Provisional Application No. 61/745,396, filed Dec. 21, 2012, entitled "STACKING CONFIGURATION AND MANAGEMENT," and U.S. Provisional Application No. 61/799,093, filed Mar. 15, 2013, entitled "METHOD FOR CONFIGURING INTERCONNECTION AND MATCHING CONFIGURATION TO A SET OF DEVICES." The entire contents of these applications are incorporated herein by reference for all purposes.

BACKGROUND

As known in the art, a "stackable switch" is a network switch that can operate independently as a standalone device or in concert with one or more other stackable switches in a "stack" or "stacking system." FIG. 1A illustrates the front face of an exemplary stackable switch 100 according to an embodiment. As shown, stackable switch 100 includes a set of data ports 102, a set of stacking ports 104, and a console port 106. Data ports 102 are operable for connecting stackable switch 100 to one or more hosts and/or data networks. Stacking ports 104 are operable for linking stackable switch 100 to other stackable switches in the same stacking system/topology. Stacking ports 104 can be dedicated ports (i.e., ports designed specifically for stacking) or high bandwidth data uplink ports that operate in a stacking mode. Console port 106 is operable for accessing the management console of stackable switch 100 in order to perform various device management functions.

FIG. 1B illustrates an exemplary stacking system 150 according to an embodiment. As shown, stacking system 150 comprises a number of stackable switches 152, 154, and 156 (each similar to stackable switch 100 of FIG. 1A) that have been linked together via their respective stacking ports. In the example of FIG. 1B, stackable switches 152, 154, and 156 form a ring topology. In addition, stackable switch 154 is designated as the "master" switch of stacking system 150, which means that switch 154 serves as the point of user contact for all management functions of system 150. For instance, stackable switch 154 can accept and process user commands directed to the overall configuration of stacking system 150. Stackable switch 154 can also communicate with non-master switches 152 and 156 as needed in order to propagate various types of management commands and data to those switches.

One aspect of configuring and operating a stacking system such as system 150 of FIG. 1B involves assigning unique identifiers (known as "device IDs" or "unit IDs") to the stackable switches in the system. These identifiers allow an administrator to precisely identify each stackable switch in order to configure the switch and its respective ports. Generally speaking, only the master switch in a stacking system will have a predefined device ID; non-master switches will not. Accordingly, it is necessary to assign device IDs to the non-master switches when they are added to the stacking system (e.g., at the time of constructing the stack or replacing one or more existing switches in the stack) so they may be properly identified/configured.

In existing stacking systems, there are typically four options for assigning device IDs: (1) manually assigning a device ID to a given switch via the switch's console port; (2) manually entering the serial number for each non-master switch in the master switch so that the master switch can assign device IDs based on the serial numbers; (3) presenting an interactive UI to an administrator that displays the system's topology and asks the administrator to enter a device ID for each switch; and (4) executing an algorithm that "guesses" appropriate device IDs based on certain metrics. Unfortunately, each of these options suffers from certain drawbacks. For example, option (1) requires an administrator or technician to physically connect a terminal to the console port of each stackable switch in order to set the switch's device ID. In a large data center that has hundreds or thousands of stackable switches (of which only a portion may be connected to console terminals), this approach is too cumbersome to be practical.

Option (2) (i.e., manually entering serial numbers into the master switch) is highly error-prone. For instance, it is quite common to mis-transcribe characters in a long serial number string. Further, the task of collecting switch serial numbers can be challenging because such numbers are typically printed on the backside or underside of each switch. These locations are not easily accessible in many environments, such as data centers where switches are mounted into racks or other similar structures.

Option (3) addresses some of the issues of options (1) and (2) since it allows an administrator to enter device IDs via an interactive UI on the master switch, without having to physically access the non-master switches. However, some environments include many identical stacking systems that need to be configured similarly. In these scenarios, the administrator may prefer a mechanism for easily applying the same device ID configuration to all stacking systems, rather than running though the interactive UI for each individual stack.

Finally, option (4) (i.e., the "best guess" algorithm) is problematic because the algorithm involves computing all possible device ID permutations in a stacking system and ranking the permutations according to various metrics in order to arrive at a device ID assignment. For stacks with a moderate to large number of switches, this can result in a very large number of permutations, to the point where the algorithm cannot be feasibly run on existing hardware (there are ways to reduce the number of permutations based on switch order in linear or ring topologies, but these optimizations cannot be used for more complex topologies such as generalized meshes). Further, even if the algorithm is able to generate a device ID assignment for a given stacking system, the resulting device IDs may not be consistent with what the administrator has in mind, and thus may need to be reassigned using one of the other options mentioned above.

SUMMARY

Techniques for assigning device identifiers in a system of devices are provided. In one embodiment, a master device of the system can maintain a first configuration that specifies a set of links between a first subset of the devices, where the first configuration includes a device identifier for each device in the first subset. The master device can further generate a second configuration that specifies a set of links between a second subset of the devices, where the second configuration is based on a physical topology of the system, and where one or more devices in the second subset are unknown devices that are not associated with a device identifier in the physical topology. The master device can then assign device identifiers to the unknown devices in the second subset by comparing the first configuration with the second configuration.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques that can be performed by a master device in a system of devices for assigning unique identifiers (referred to as "device IDs") to the various devices in the system. At a high level, the techniques can include one or more of the following features: (1) the receipt and/or maintenance of a provisional configuration that specifies provisional links that do not yet exist in the system's physical topology, as well as device IDs for the devices at the endpoints of the provisional links; (2) the generation of a physical configuration that specifies existing links in the system's physical topology; (3) the assignment of device IDs to "unknown" devices in the physical configuration (i.e., devices without assigned IDs) by comparing the provisional configuration with the physical configuration; and (4) the merging of the provisional configuration and the physical configuration into a merged configuration that is stored on the master device. Taken together, these features enable system administrators to easily assign devices IDs to the unknown devices in the system at, e.g., the time of system construction or device replacement, without incurring the drawbacks associated with conventional device ID assignment approaches.

For clarity of explanation, in the sections that follow, certain examples and embodiments are described in the context of assigning device IDs to stackable switches in a stacking system. However, it should be appreciated that the techniques described herein can apply to other types of systems where simplified device ID assignment is a desired or useful feature, such as Ethernet or SAN fabrics. Accordingly, within the detailed description, references to "stacks" or "stacking systems" can be construed as encompassing generalized systems of devices, and references to "switches" or "stackable switches" can be construed as encompassing generalized devices within a system.

Figure 2A:
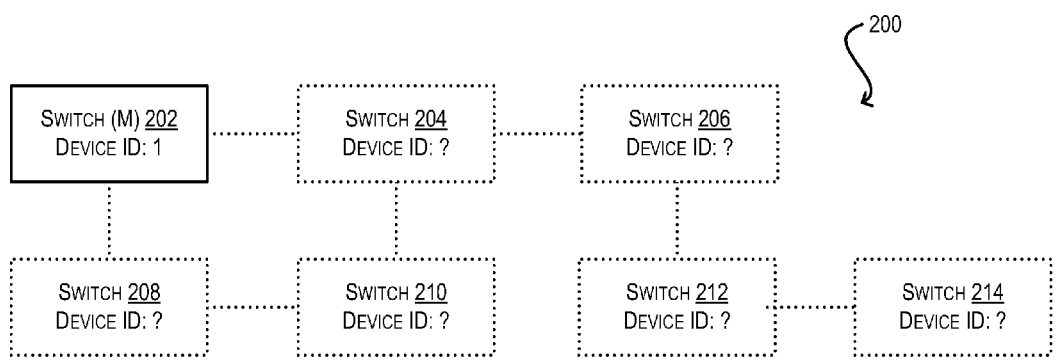
FIGS. 2A, 2B, 2C, and 2D depict a device ID assignment process that can be performed at the time of stack construction according to an embodiment.

FIG. 2A depicts an exemplary stacking system 200 according to an embodiment, before the system has been fully constructed. At this point in time, stacking system 200 includes a single device, switch 202, which is the master switch for the system. Master switch 202 is associated with a predefined device ID of 1.

Assume that an administrator of stacking system 200 wishes to add six additional switches to the system (i.e., switches 204, 206, 208, 210, 212, and 214). Switches 204-214 are not yet part of the physical topology of stacking system 200, but the administrator may wish to interconnect these switches in the form of a mesh-like topology as shown via dotted lines in FIG. 2A.

To accomplish this, device IDs must be assigned to new switches 204-214 so that their respective ports can be uniquely identified and configured. However, as noted in the Background section, existing techniques for performing device ID assignment in stacking systems suffer from various drawbacks.

Figure 2B:
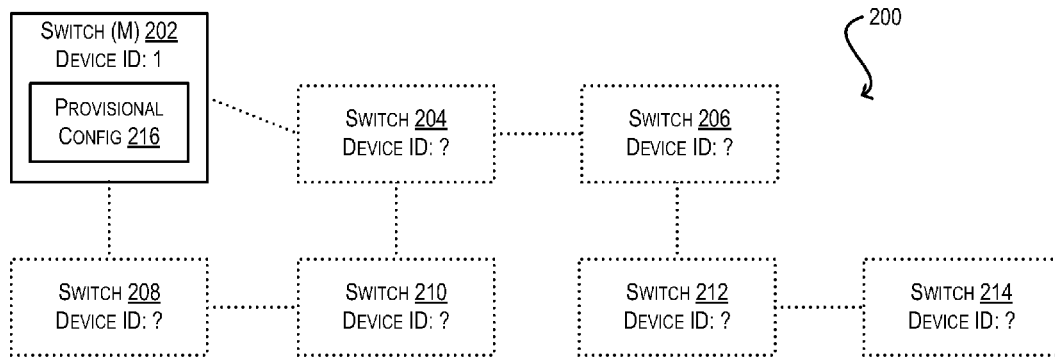
Figure 2C:
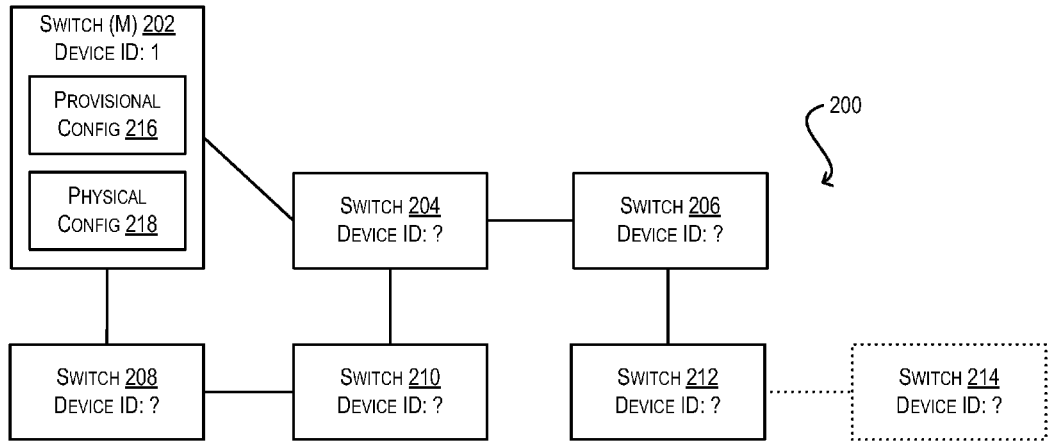
Figure 2D:
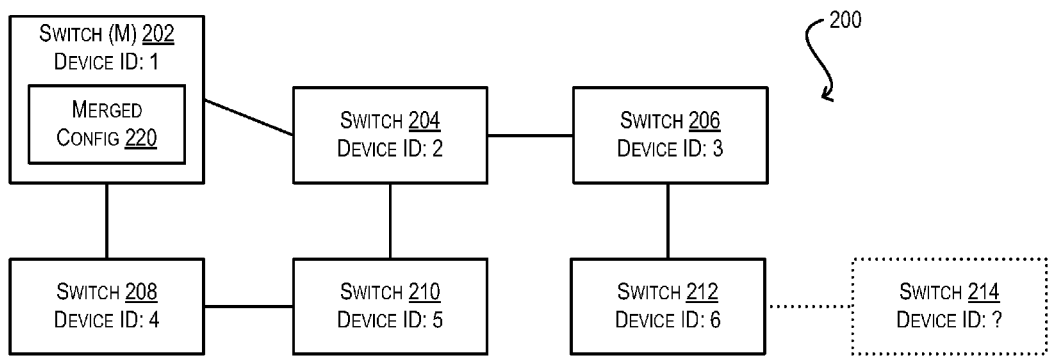

To address these (and other similar) issues, master switch 202 can implement a novel device ID assignment process as illustrated in FIGS. 2B, 2C, and 2D. In particular, master switch 202 can first receive, from the administrator, a provisional configuration 216 for stacking system 200 (as shown in FIG. 2B). Provisional configuration 216 can include a description of provisional links that the administrator wishes to have in the physical topology of system 200. The provisional links can represent links that do not yet exist in system 200's physical topology, but may exist at some later point (e.g., once switches 204-214 have been physically added). As part of this link description, provisional configuration 216 can specify a device ID for each switch that is located at an endpoint of a provisional link.

For example, the listing below is a provisional configuration that specifies provisional links between switches 202-214. In this listing, each line corresponds to a provisional link in the format [endpoint device ID/local port—endpoint device ID/local port]. It should be appreciated that other data formats (such as grouping links by endpoint switch, or including an extra "module" identifier for switches that have multiple port modules) are also possible.

| Listing 1 |
| --- |
| 1/1-2/2 |
| 2/1-3/2 |
| 3/1-6/2 |
| 1/2-4/2 |
| 4/1-5/2 |
| 5/1-2/3 |
| 6/1-7/1 |

In one embodiment, each of the provisional links shown in Listing 1 can be entered into master switch 202 via a console command, such as "connect [endpoint device ID/local port—endpoint device ID/local port]," or some variant thereof. Alternatively, the information of Listing 1 can be captured in a file or some other data structure that is submitted to master switch 202.

Once provisional configuration 216 has been received and stored on master switch 202, the administrator can physically connect one or more of the switches he/she wishes to add to stacking system 200. For example, FIG. 2C illustrates stacking system 200 after switches 204-212, but not switch 214, have been physically connected (as represented by solid lines).

Master switch 202 can then generate a second configuration (shown as physical configuration 218 in FIG. 2C) based on the updated physical topology with the newly added switches. Physical configuration 218 can include a description of the links that are physically present in the topology (referred to as "existing links"). As part of this link description, physical configuration 218 can specify device IDs for endpoint devices that have already been already assigned device IDs. However, physical configuration 218 generally will not specify device IDs for endpoint devices that have not yet been assigned IDs (i.e., unknown devices), since that information cannot be gleaned solely from the physical topology.

For example, the listing below is a physical configuration that may be generated by master switch 202 in the context of FIG. 2C. Each line corresponds to an existing link in the format [endpoint device ID/local port—endpoint device ID/local port]. Since master switch 202 is the only switch in the physical topology with an assigned device ID at this point (i.e., device ID 1), switch 202 is the only switch with a specified ID in the physical configuration; all other switches have an unknown device ID (represented by the "?" symbol).

| Listing 2 |
|---|
| 1/1-?/2 |
| ?/1-?/2 |
| ?/1-?/2 |
| 1/2-?/2 |
| ?/1-?/2 |
| ?/1-?/3 |

It should be noted that, although the format of listing 2 is identical to listing 1, in certain embodiments physical configuration 218 can be generated and/or stored in a format that is different than provisional configuration 216. Generally speaking, physical configuration 218 can be represented using any format that is sufficient to capture the existing links within the physical topology of stacking system 200, as well as the device IDs of known switches in the system.

Once physical configuration 218 has been generated, master switch 202 can execute an algorithm for comparing provisional configuration 216 with physical configuration 218 in order to assign device IDs to the unknown switches in the physical topology. In a particular embodiment, this can comprise traversing the existing links in physical configuration 218 and checking for corresponding provisional links in provisional configuration 216. If a provisional link is found that leads to an unknown switch in physical configuration 218, master switch can assign the device ID specified in the provisional link to the unknown switch. In this way, master switch 202 can map the user-defined device IDs in provisional configuration 216 to the switches that need device IDs in physical configuration 218. A generalized version of this algorithm is described with respect to FIGS. 6, 7A, and 7B below.

Finally, master switch 202 can transmit the device ID assignments determined via the algorithm above to the unknown switches (thereby allowing the switches to locally save their respective device IDs). Master switch 202 can also merge provisional configuration 216 and physical configuration 218 into a merged configuration 220 (as shown in FIG. 2D), and save the merged configuration in, e.g., a local non-volatile memory for future use. Merged configuration 220 can identify all of the existing links in the physical topology (with the assigned device IDs for each endpoint switch), as well as the provisional links that have not yet been added to the physical topology. For instance, the listing below is a merged configuration generated by combining the provisional configuration of listing 1 with the physical configuration of listing 2:

| Listing 3 |
|---|
| 1/1-2/2 |
| 2/1-3/2 |
| 3/1-6/2 |
| 1/2-4/2 |
| 4/1-5/2 |
| 5/1-2/3 |
| 6/1-7/1 |

In listing 3 above, all of the unknown device IDs (represented by "?" in listing 2) have been filled in based on the device IDs in listing 1. In addition, provisional link [6/1-7/1] has been merged in from listing 1 (even though there is currently no such link in the physical topology), since the device ID(s) in this provisional link may be needed at a later point in time (for example, if switch 214 is added in the future).

With the device ID assignment process illustrated in FIGS. 2B-2D, many of the problems associated with prior art assignment techniques can be mitigated or avoided. For example, there is no need for an administrator to physically access each switch in the system in order to set device IDs via a console connection or collect serial numbers; instead, the administrator can simply enter desired device ID assignments into the master switch (via the provisional configuration) and allow the master switch to figure out how to map those assignments to the system's physical topology. In some embodiments, the administrator can repeat this step on multiple, identical stacks by submitting the same configuration commands or file on each stack master, thereby easily propagating the same device ID configuration to each stack.

Further, since device IDs are assigned based on user-defined values, there is no need to execute a "best guess" algorithm in order to guess appropriate device IDs (unless the provisional configuration is incomplete). This is particularly important in stacking systems that support complex topologies such as meshes, because the best guess algorithm is generally too computationally expensive to be used on such topologies. This also means that there is no need for the administrator to modify device IDs that are determined via the "best guess" algorithm if, e.g., the administrator decides that the guessed IDs are not suitable.

Figure 3A:
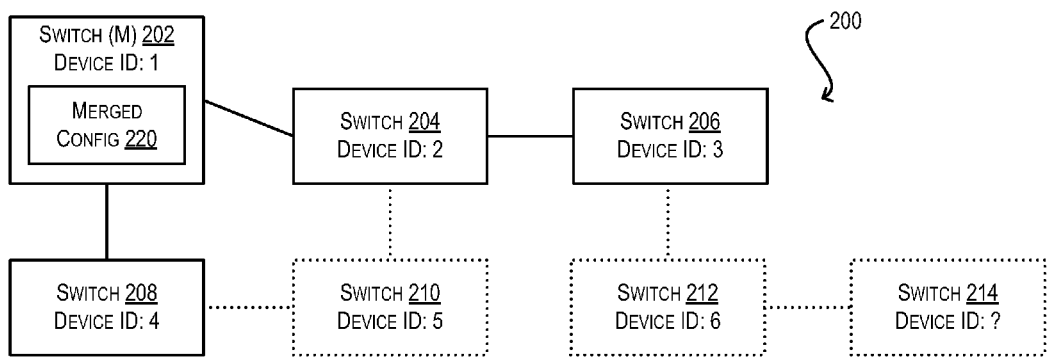
FIGS. 3A, 3B, and 3C depict a device ID assignment process that can be performed at the time of replacing one or more switches in a stack according to an embodiment.
Figure 3B:
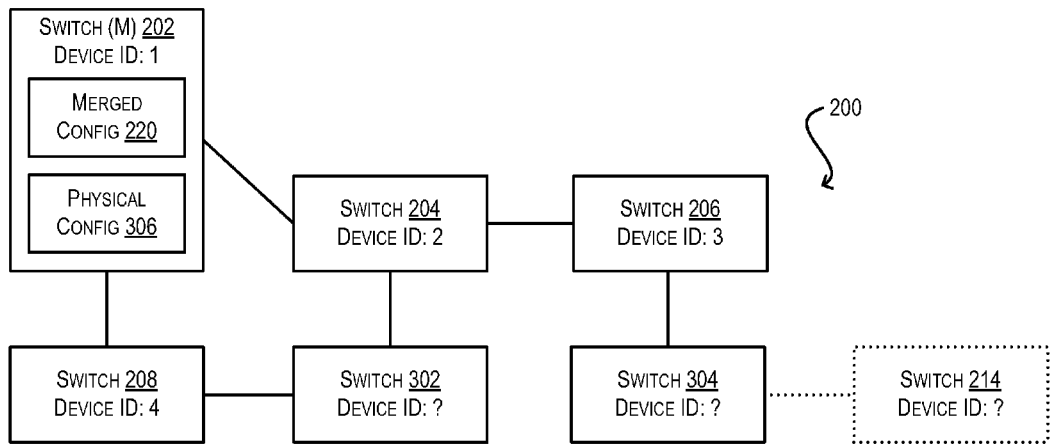
Figure 3C:
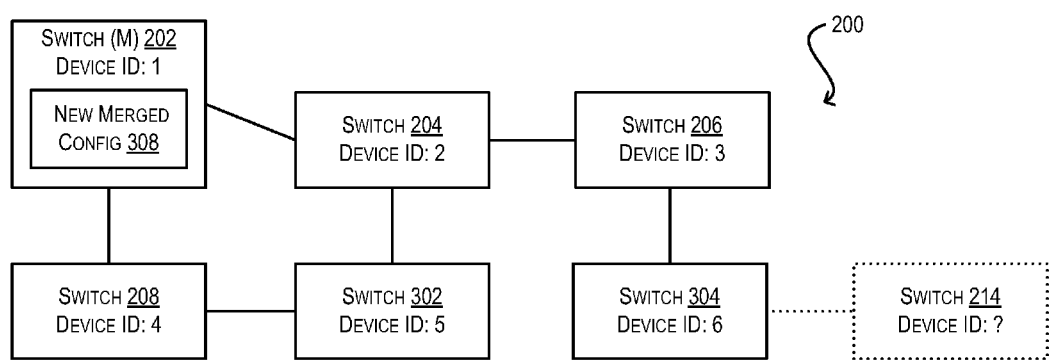

While FIGS. 2A-2D specifically relate to a "stack construction scenario" (i.e., a scenario where new switches are added to stacking system 200 and no existing switches are removed), a similar process may be used by master switch 202 to assign device IDs in a "switch replacement scenario" (i.e., a scenario where one or more existing switches are removed from stacking system 200 and replaced with new, replacement switches). In this scenario, master switch 202 must figure out what device IDs to assign to the replacement switches. FIGS. 3A, 3B, and 3C depict a series of diagrams illustrating this process according to an embodiment. In these figures, the events of FIGS. 2A-2D have already transpired, and thus the initial state of stacking system 200 is the state shown in FIG. 2D.

Starting with FIGS. 3A and 3B, assume that the administrator of stacking system 200 physically replaces existing switches 210 and 212 with new switches. This is shown by the removal of switches 210 and 212 in FIG. 3A and the addition of replacement switches 302 and 304 in FIG. 3B.

In response to this change in the physical topology, master switch 202 can generate a new physical configuration 306 (as shown in FIG. 3B). Since replacement switches 302 and 304 have not yet been assigned device IDs, they will not have device IDs in physical configuration 306. For example, physical configuration 306 may comprise the following:

| Listing 4 |
|---|
| 1/1-2/2 |
| 2/1-3/2 |
| 3/1-?/2 |
| 1/2-4/2 |
| 4/1-?/2 |
| ?/1-2/3 |

Once physical configuration 306 has been generated, master switch 202 can execute an algorithm (identical to the algorithm described with respect to FIGS. 2A-2D) for comparing merged configuration 220 with physical configuration 306 in order to assign device IDs to replacement switches 302 and 304. Since merged configuration 220 includes the device IDs for old switches 210 and 212, and since the positions of replacement switches 302 and 304 within the physical topology are exactly the same as old switches 210 and 212, the end result of this processing is that replacement switches 302 and 304 will be assigned the same device IDs as old switches 210 and 212 respectively (i.e., device IDs 5 and 6).

Finally, master switch 202 can transmit the assigned device IDs to replacement switches 302 and 304 so that they can be locally set on each replacement switch (as shown in FIG. 3C). Master switch 202 can also merge physical configuration 306 and merged configuration 220 into a new merged configuration 308 and save new merged configuration 308 for future use (e.g., in the case of a future switch replacement).

With the approach shown in FIGS. 3A-3C, the administrator does not need to manually modify or update any device ID configuration in system 200 in order to carry out switch replacement; the administrator need only swap the old switches with the new, replacement switches in the physical topology. Master switch 202 can then automatically assign the device IDs of the old switches to the replacement switches by comparing its existing configuration (e.g., merged configuration 220) with the topology-derived configuration (e.g., physical configuration 306). This significantly simplifies the replacement process, particularly when replacing multiple switches in a stack.

Figure 4:
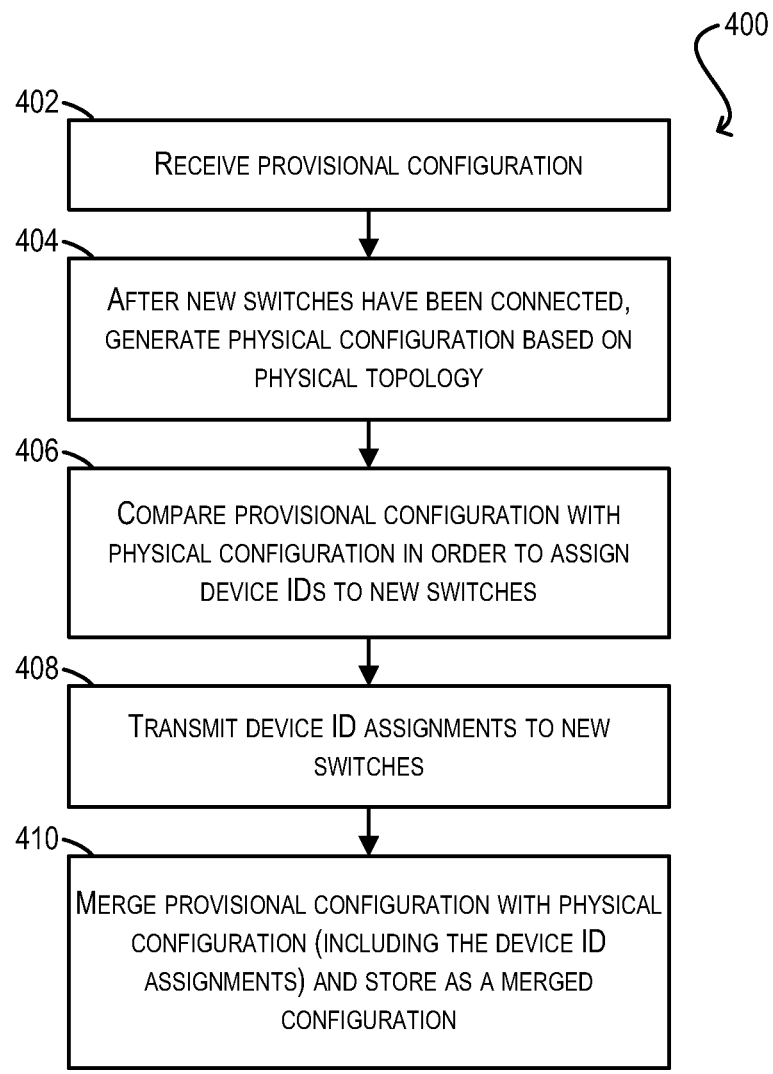
FIG. 4 depicts a flowchart of the device ID assignment process of FIGS. 2A-2D according to an embodiment.

FIG. 4 depicts a flowchart 400 of the processing described with respect to FIGS. 2A-2D for assigning device IDs in a stack construction scenario. At block 402, a master switch in a stacking system can receive (from, e.g., an administrator) a provisional configuration that specifies one or more provisional links in the system. As discussed above, the provisional links can correspond to links that do not yet exist in the system's physical topology. Further, each provisional link definition can identify device IDs for the endpoints of the link.

In certain embodiments, as part of step 402, the master switch can actively prevent the administrator from entering provisional link information for existing links (i.e., links that already exist in the physical topology). This avoids errors in which existing link configurations are erroneously overwritten. For instance, the master switch can check whether the end ports for each provisional link are in "down states" before accepting the provisional configuration. If the end port for a particular provisional link is in an "up state," that means the port is physically connected, and thus the provisional configuration is rejected. If the provisional link is a trunk comprising multiple ports, any trunk port in an up state can result in a rejection.

At block 404, the master switch can generate a physical configuration based on the system's physical topology (after one or more new switches have been connected). The physical configuration can specify existing links in the topology. In a particular embodiment, the master switch can derive the physical configuration by running a standard topology discovery algorithm.

Generally speaking, the physical configuration generated at block 404 will include device ID information for switches in the system that have already been assigned IDs (such as the master switch). However, the physical configuration will not include device ID information for unknown switches that have not yet been assigned IDs (such as newly added switches).

At block 406, the master switch can execute an algorithm for comparing the provisional configuration with the physical configuration. At a high level, this algorithm can map provisional links in the provisional configuration to existing links in the physical configuration, and thereby leverage the device ID information in the provisional configuration to assign device IDs to unknown switches in the physical configuration/topology. A detailed discussion of this algorithm is provided with respect to FIGS. 6, 7A, and 7B below.

Once the master switch has determined devices IDs for the unknown switches per block 406, the master switch can transmit the assignments to the respective switches so that the device IDs can be locally saved (block 408). In addition, the master switch can merge the provisional configuration with the physical configuration in order to generate a merged configuration (block 410). The merged configuration can include all of the existing links in the system's physical topology (with correctly assigned device IDs), as well as provisional links that have not yet been added to the physical topology. This merged configuration can then be saved in a local non-volatile memory (e.g., NVRAM) of the master device.

Although not shown in FIG. 4, in some situations the provisional configuration received at block 402 may not contain enough information to assign device IDs to all of the unknown switches in the physical configuration/topology. For example, the provisional configuration may only specify a portion of the links that are actually added to the physical topology (and included in the system's physical configuration). In these situations, the master switch can uses one or more different methods for determining device IDs for those unassigned switches. For instance, in one embodiment, the master switch can execute the "best guess" algorithm described in the Background section for guessing device IDs for the unassigned switches. In another embodiment, the master switch can ask the administrator to provide device IDs for the unassigned switches. One of ordinary skill in the art will recognize many possible alternatives.

Figure 5:
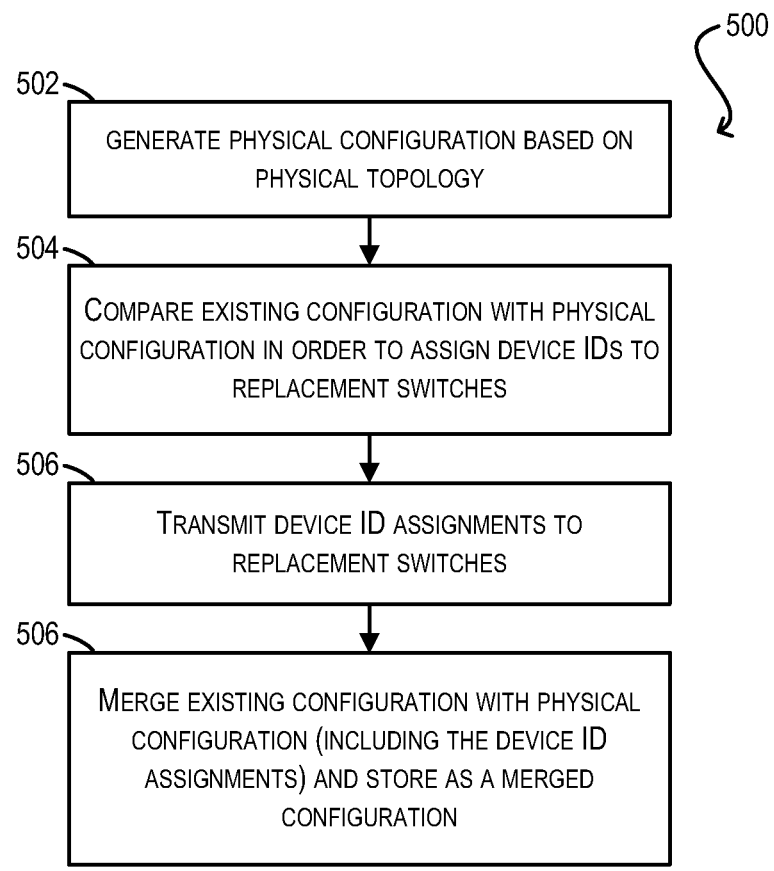
FIG. 5 depicts a flowchart of the device ID assignment process of FIGS. 3A-3C according to an embodiment.

FIG. 5 depicts a flowchart 500 of the processing described with respect to FIGS. 3A-3C for assigning device IDs in a switch replacement scenario. Flowchart 500 assumes that an administrator of the system has already performed the task of physically replacing one or more switches in the system's physical topology.

At block 502, the master switch can generate a physical configuration based on the system's physical topology (with the replacement switches in place). The master switch can then compare its existing configuration (e.g., the merged configuration generated at block 410 of FIG. 4) with the physical configuration in order to assign device IDs to the replacement switches (block 504). In various embodiments, the master switch can use the same algorithm described with respect to block 406 of FIG. 4 for performing this comparison/assignment.

At block 506, the master switch can transmit the assigned device IDs to the replacement switches so that the IDs can be saved locally. Finally, at block 508, the master switch can generate a new merged configuration in a manner similar to block 410 of FIG. 4.

Figure 6:
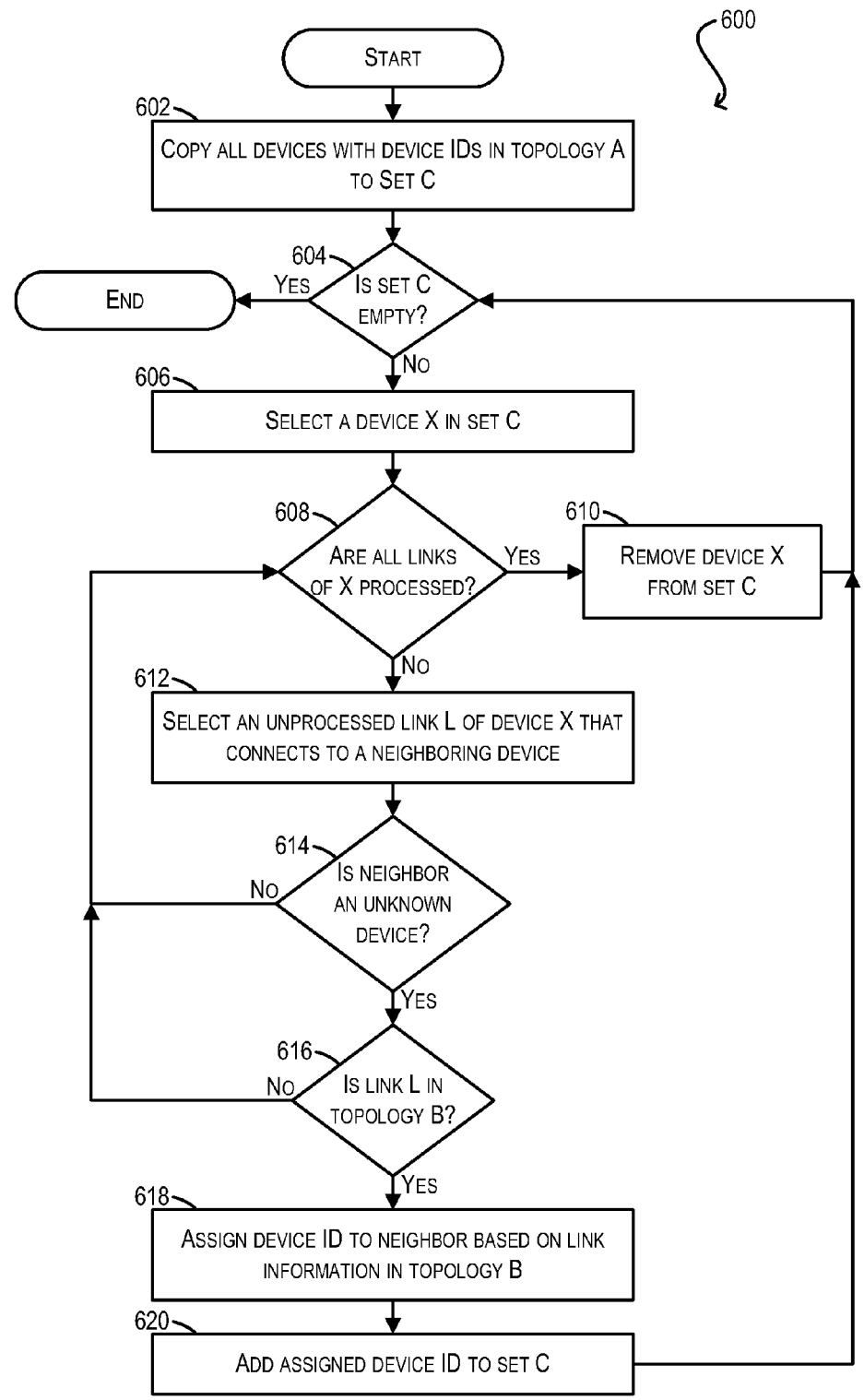
FIG. 6 depicts a flowchart of a generalized algorithm for assigning device IDs by comparing two device topologies according to an embodiment.

FIG. 6 depicts a flowchart 600 of a generalized algorithm for assigning device IDs in a system of devices by comparing two system topologies ("A" and "B") according to an embodiment. This algorithm may be used to perform the device ID assignment described at, e.g., block 406 of FIG. 4 and block 504 of FIG. 5.

In flowchart 600, topology A refers to the physical topology of the system (i.e., the topology corresponding to the system's physical configuration). Topology A includes at least one device with an assigned device ID (e.g., the master device). Topology A also includes one or more devices with no assigned device IDs (i.e., unknown devices). Generally speaking, topology A will not be partitioned, since topology A will typically be generated via a topology discovery algorithm that relies on a connected path between any two devices.

Topology B refers to the provisional topology of the system (i.e., the topology corresponding to the system's provisional configuration). Each link in topology B is a provisional link that identifies device IDs for its two endpoint devices. Topology B may not be complete, since an administrator may decide not to configure all provisional links. In these cases, topology B may be partitioned into multiple sections (in other words, some devices may not have a path for reaching all other devices). Further, topology B may be a superset, a subset, or contain only partial elements of topology A.

The goal of the algorithm of FIG. 6 is to assign device IDs to the unknown devices in topology A based on the device ID/link information in topology B.

Starting with block 602, the master device of the system can first copy all devices with assigned device IDs in topology A to a set C. The master device can then check whether set C is empty (block 604). If so, the master device can determine that the algorithm is complete and flowchart 600 can end.

If set C is not empty, the master device can select a device X in set C and can check whether all of the links of device X have been processed by the algorithm (blocks 606 and 608). If all of the links have been processed, the master device can remove device X from set C (block 610) and return to block 604. Otherwise, the master device can select an unprocessed link L of device X that connects to a neighbor device (block 612).

At block 614, the master device can check whether the neighbor device connected via link L is an unknown device (i.e., does not have an assigned device ID). If it is not an unknown device, the master device can conclude that it does not need a device ID. Accordingly, the master device can return to block 608 in order to process additional links of device X.

If the neighbor device is an unknown device, the master device can check whether link L is also in topology B (block 616). If it is not, the master device can determine that there is not enough information to assign a device ID to the neighbor device, and can return to block 608.

On the other hand, if link L is in topology B, the master device can assign a device ID to the neighbor device based on topology B's provisional link information (block 618). For example, if the provisional link in topology B indicates that the device ID for device X is 2 and the device ID for the neighbor device is 5, the master device can assign device ID 5 to the neighbor device in topology A.

At block 620, the master device can add the neighbor device (via its assigned device ID) to set C. Finally, flowchart 600 can return to block 604 so that the master device can process additional devices in set C. As noted previously, once set C becomes empty, flowchart 600 can end.

Figure 7A:
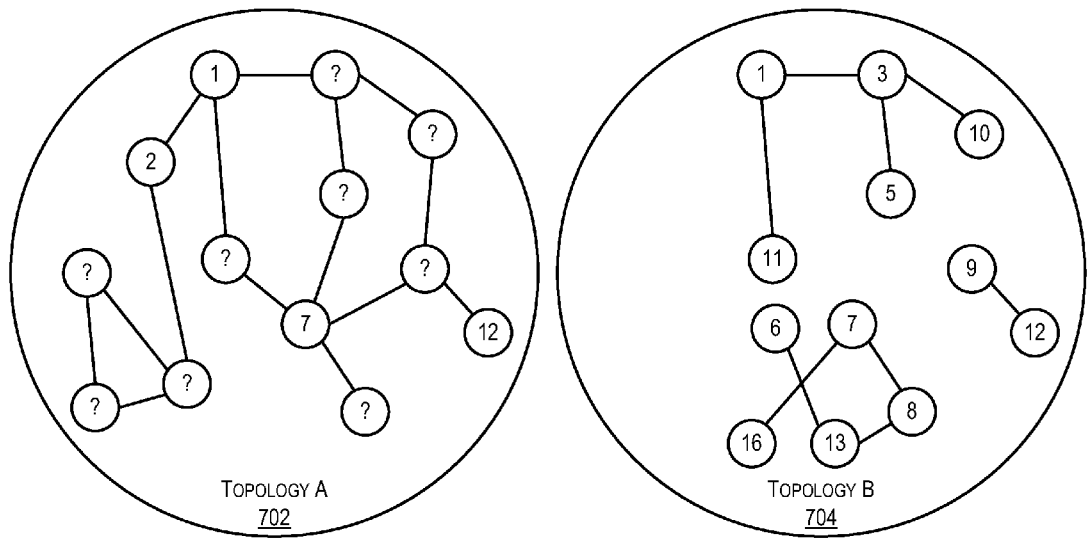
FIGS. 7A and 7B depict an exemplary application of the algorithm of FIG. 6 according to an embodiment.
Figure 7B:
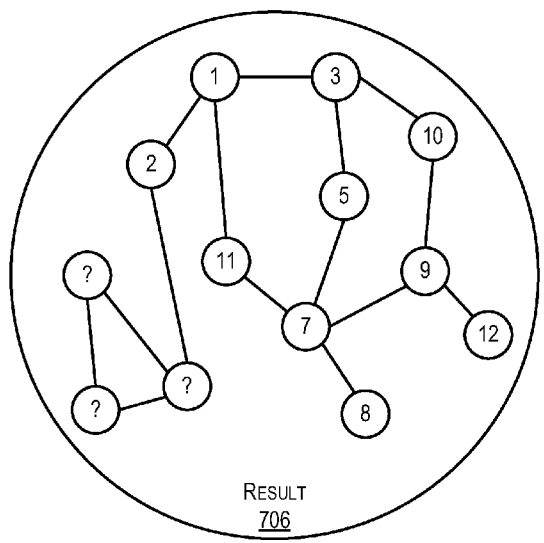

FIGS. 7A and 7B illustrate an exemplary application of the algorithm of FIG. 6 according to an embodiment. In particular, FIG. 7A depicts an example topology A (702) and an example topology B (704) that can be provided as input to the algorithm. As shown, topology A includes four devices with assigned device IDs (1, 2, 7, and 12), and nine devices with unassigned IDs. Topology B is an incomplete provisional configuration, and thus includes provisional links for some (but not all) of the links specified in topology A. FIG. 7B depicts a result topology 706 that shows the device ID assignments determined by the algorithm.

The following is a list of steps that can be carried out by the algorithm in order to arrive at result topology 706:

1. Create initial set C containing b{1, 2, 7, 12}
2. Select device 1; neighbor devices 3 and 11 are assigned and added to set C; device 1 is removed; set C now contains {2, 7, 12, 3, 11}
3. Select device 2; no device IDs are assigned; device 2 is removed; set C now contains {7, 12, 3, 11}
4. Select device 7; device 8 is assigned and added to set C; device 7 is removed; set C now contains {12, 3, 11, 8}
5. Select device 12; device 9 is assigned and added to set C; device 12 is removed; set C now contains {3, 11, 8, 9}
6. Select device 3; devices 5 and 10 are assigned and added to set C; device 3 is removed; set C now contains {11, 8, 9, 5, 10}
7. Select device 11; no device IDs are assigned; device 11 is removed; set C now contains {8, 9, 5, 10}
8. Select device 8; no device IDs are assigned; device 8 is removed; set C now contains {9, 5, 10}
9. Select device 9; no device IDs are assigned; device 9 is removed; set C now contains {5, 10}
10. Select device 5; no device IDs are assigned; device 5 is removed; set C now contains {10}
11. Select device 10; no device IDs are assigned; device 10 is removed; set C is now empty and algorithm ends.

In result topology 706, three devices are not assigned device IDs because topology B does not include provisional links connected to those devices. As noted with respect to FIG. 4, the IDs for these unassigned devices can be determined via alternative mechanisms, such as running the "best guess" algorithm, querying the administrator, etc.

Figure 1A:
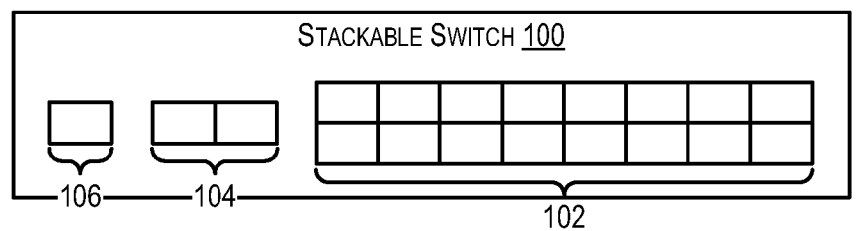
FIG. 1A depicts a stackable switch according to an embodiment.
Figure 8:
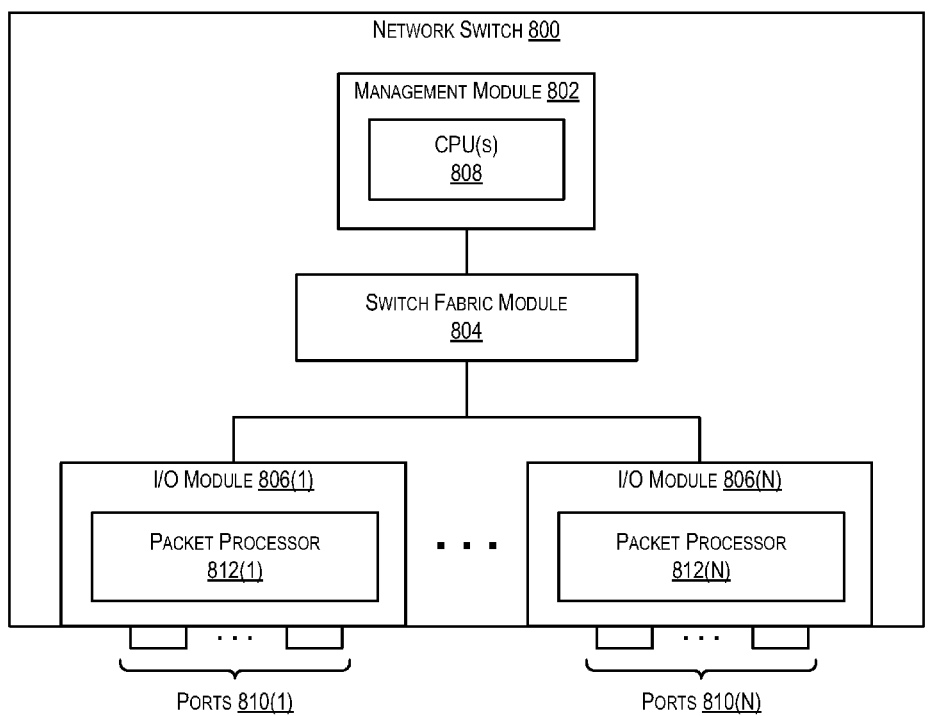
FIG. 8 depicts a network switch according to an embodiment.

FIG. 8 depicts a network switch 800 according to an embodiment. Network switch 800 can be used to implement any of the stackable switches/devices described in the foregoing disclosure, such as stackable switch 100 of FIG. 1A.

As shown, network switch 800 includes a management module 802, a switch fabric module 804, and a number of I/O modules 806(1)-806(N). Management module 802 represents the control plane of network switch 800 and thus includes one or more management CPUs 808 for managing/controlling the operation of the device. Each management CPU 808 can be a general purpose processor, such as a PowerPC, Intel, AMD, or ARM-based processor, that operates under the control of software stored in an associated memory (not shown).

Figure 1B:
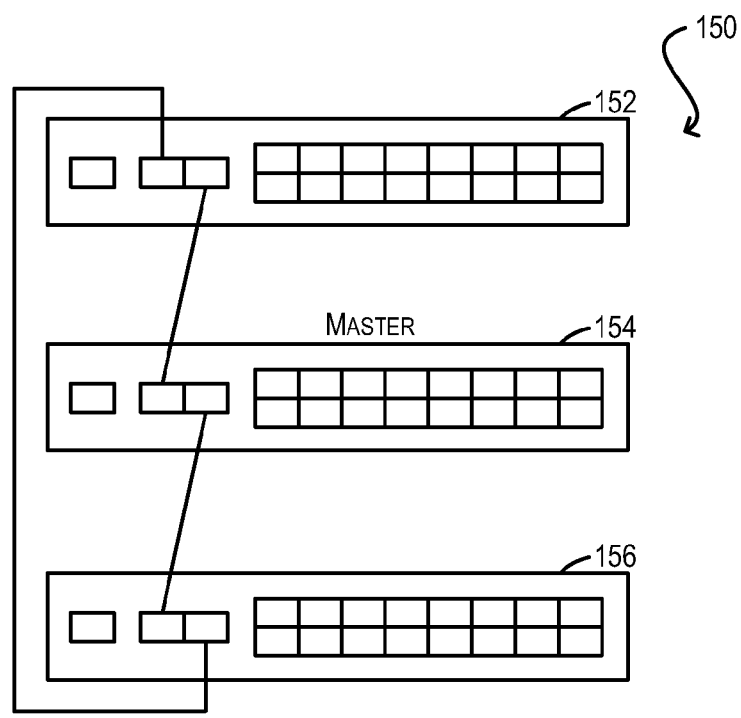
FIG. 1B depicts a stacking system according to an embodiment.

Switch fabric module 804 and I/O modules 806(1)-806(N) collectively represent the data, or forwarding, plane of network switch 800. Switch fabric module 804 is configured to interconnect the various other modules of network switch 800. Each I/O module 806(1)-806(N) can include one or more input/output ports 810(1)-810(N) that are used by network switch 800 to send and receive data packets. As noted with respect to FIGS. 1A and 1B, ports 810(1)-810(N) can comprise data ports for communicating with hosts/other network devices, as well as stacking ports for communicating with other switches in the same stacking system. Each I/O module 806(1)-806(N) can also include a packet processor 812(1)-812(N). Packet processor 812(1)-812(N) is a hardware processing component (e.g., an FPGA or ASIC) that can make wire speed decisions on how to handle incoming or outgoing data packets.

It should be appreciated that network switch 800 is illustrative and not intended to limit embodiments of the present invention. Many other configurations having more or fewer components than switch 800 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   maintaining, by a master device in a system of network devices, a first configuration that specifies a first set of links between a first group of network devices in the system, wherein the first set of links includes one or more provisional links that are user-defined and do not exist in a physical topology of the system, and wherein each link in the first set of links specifies device identifiers for network devices located at endpoints of the link;
   generating, by the master device, a second configuration that specifies a second set of links between a second group of network devices in the system, wherein the second set of links includes one or more existing links in the physical topology of the system, wherein one or more network devices in the second group are unknown devices that are not associated with a device identifier in the physical topology, and wherein the second set of links include at least one link that is not in the first set of links;
   assigning, by the master device, device identifiers to the unknown devices in the second group by:
      traversing the second set of links to find corresponding links in the first set of links; and
      if a first link is found in the first set of links that corresponds to a second link in the second set of links and if the second link leads to an unknown device in the second group, assigning the unknown device a device identifier for a corresponding network device at an endpoint of the first link;
   transmitting, by the master device, the assigned device identifiers to the unknown devices for local storage on the unknown devices;
   merging, by the master device, the one or more provisional links in the first set of links with the one or more existing links in the second set of links to generate a merged configuration for the system; and
   storing the merged configuration in a nonvolatile memory of the master device.

2. The method of claim 1 wherein the first configuration is provided by a user via one or more console commands.

3. The method of claim 1 wherein the assigning comprises:
   creating a device set that includes every network device in the second group that is not an unknown device.

4. The method of claim 3 wherein the assigning further comprises:
   selecting a network device in the device set;
   for each link of the selected network device that is specified in the second configuration, if the link leads to an unknown device:
      searching for a corresponding link in the first configuration; and
      if the corresponding link is found in the first configuration:
         assigning the unknown device a device identifier based on the corresponding link; and
         adding the device identifier to the device set; and
   removing the selected network device from the device set.

5. The method of claim 4 further comprising:
   repeating the steps of claim 4 until the device set is empty.

6. The method of claim 1 further comprising, if one or more unknown devices cannot be assigned a device identifier:
   executing an algorithm for assigning device identifiers to the one or more unknown devices that takes into account metrics for all possible assignment permutations.

7. The method of claim 1 wherein the unknown devices are new network devices that have been added to the system.

8. The method of claim 7 wherein the unknown devices are replacement network devices that replace one or more previously existing network devices in the system.

9. The method of claim 1 wherein the system of network devices is a stacking system, and wherein each network device is a stackable switch.

10. A non-transitory computer readable medium having stored thereon program code executable by a processor, the program code comprising:
- code that causes the processor to maintain a first configuration specifying a first set of links between a first group of network devices in a system of network devices, wherein the first set of links includes one or more provisional links that are user-defined and do not exist in a physical topology of the system, and wherein each link in the first set of links specifies device identifiers for network devices located at endpoints of the link;
- code that causes the processor to generate a second configuration specifying a second set of links between a second group of network devices in the system, wherein the second set of links includes one or more existing links in the physical topology of the system, wherein one or more network devices in the second group are unknown devices that are not associated with a device identifier in the physical topology, and wherein the second set of links include at least one link that is not in the first set of links;
- code that causes the processor to assign device identifiers to the unknown devices in the second group by:
  - traversing the second set of links to find corresponding links in the first set of links; and
  - if a first link is found in the first set of links that corresponds to a second link in the second set of links and if the second link leads to an unknown device in the second group, assigning the unknown device a device identifier for a corresponding network device at an endpoint of the first link;
- code that causes the processor to transmit the assigned device identifiers to the unknown devices for local storage on the unknown devices;
- code that causes the processor to merge the one or more provisional links in the first set of links with the one or more existing links in the second set of links to generate a merged configuration for the system; and
- code that causes the processor to store the merged configuration in a nonvolatile memory.

11. The non-transitory computer readable medium of claim 10 wherein the first configuration is provided by a user via one or more console commands.

12. The non-transitory computer readable medium of claim 10 wherein the assigning comprises:
- creating a device set that includes every network device in the second group that is not an unknown device;
- selecting a network device in the device set;
- for each link of the selected network device that is specified in the second configuration, if the link leads to an unknown device:
  - searching for a corresponding link in the first configuration; and
  - if the corresponding link is found in the first configuration:
    - assigning the unknown device a device identifier based on the corresponding link; and
    - adding the device identifier to the device set;
- removing the selected network device from the device set; and
- repeating the selecting and subsequent steps until the device set is empty.

13. A network device comprising:
- a processor; and
- a non-transitory computer readable medium having stored thereon program code which, when executed by the processor, causes the processor to:
  - maintain a first configuration specifying a first set of links between a first group of network devices in a system of network devices, wherein the first set of links includes one or more provisional links that are user-defined and do not exist in a physical topology of the system, and wherein each link in the first set of links specifies device identifiers for network devices located at endpoints of the link;
  - generate a second configuration specifying a second set of links between a second group of network devices in the system, wherein the second set of links includes one or more existing links in the physical topology of the system, wherein one or more network devices in the second group are unknown devices that are not associated with a device identifier in the physical topology, and wherein the second set of links include at least one link that is not in the first set of links;
  - assign device identifiers to the unknown devices in the second group by:
    - traversing the second set of links to find corresponding links in the first set of links; and
    - if a first link is found in the first set of links that corresponds to a second link in the second set of links and if the second link leads to an unknown device in the second group, assigning the unknown device a device identifier for a corresponding device at an endpoint of the first link;
  - transmit the assigned device identifiers to the unknown devices for local storage on the unknown devices
  - merge the one or more provisional links in the first set of links with the one or more existing links in the second set of links to generate a merged configuration for the system; and
  - store the merged configuration in a nonvolatile memory.

14. The network device of claim 13 wherein the first configuration is provided by a user via one or more console commands.

15. The network device of claim 13 wherein the assigning comprises:
- creating a device set that includes every network device in the second group that is not an unknown device;
- selecting a network device in the device set;
- for each link of the selected network device that is specified in the second configuration, if the link leads to an unknown device:
  - searching for a corresponding link in the first configuration; and
  - if the corresponding link is found in the first configuration:
    - assigning the unknown device a device identifier based on the corresponding link; and
    - adding the device identifier to the device set;
- removing the selected network device from the device set; and
- repeating the selecting and subsequent steps until the device set is empty.

16. The method of claim 1 wherein the first set of links are entered into the master device by a user of the system, and wherein the method further comprises:

verifying, at the time the user enters each link in the first set of links, whether the link already exists in the physical topology of the system; and if the link already exists in the physical topology, rejecting the link.

17. The non-transitory computer readable medium of claim 10 wherein the first set of links are entered by a user of the system, and wherein the program code further comprises:

code that causes the processor to verify, at the time the user enters each link in the first set of links, whether the link already exists in the physical topology of the system; and if the link already exists in the physical topology, code that causes the processor to reject the link.

18. The network device of claim 13 wherein the first set of links are entered by a user of the system, and wherein the program code further causes the processor to:

verify, at the time the user enters each link in the first set of links, whether the link already exists in the physical topology of the system; and if the link already exists in the physical topology, reject the link.

\* \* \* \* \*